(12) United States Patent
Mashita et al.

(10) Patent No.: US 12,517,021 B2
(45) Date of Patent: Jan. 6, 2026

(54) PERFORMANCE EVALUATION METHOD FOR ELASTIC MATERIAL

(71) Applicant: Sumitomo Rubber Industries, Ltd., Kobe (JP)

(72) Inventors: Ryo Mashita, Kobe (JP); Hiroyuki Kishimoto, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 370 days.

(21) Appl. No.: 18/127,347

(22) Filed: Mar. 28, 2023

(65) Prior Publication Data

US 2023/0332990 A1    Oct. 19, 2023

(30) Foreign Application Priority Data

Apr. 18, 2022    (JP) .................. 2022-068454

(51) Int. Cl.
*G01N 3/08* (2006.01)
*G01N 3/56* (2006.01)
(Continued)

(52) U.S. Cl.
CPC .................. *G01N 3/08* (2013.01); *G01N 3/56* (2013.01); *G01N 9/24* (2013.01); *G01N 9/36* (2013.01); *G01N 23/046* (2013.01); *G01N 33/445* (2013.01); *G01N 2203/0017* (2013.01); *G01N 2203/0037* (2013.01);
(Continued)

(58) Field of Classification Search
CPC .. G01N 3/08; G01N 3/56; G01N 9/24; G01N 9/36; G01N 2203/0017; G01N 2203/0037; G01N 2203/0062; G01N 2203/0091; G01N 2203/0647; G01N 2203/0641; G01N 2223/648; G01N 2223/627; G01N 2223/634; G01N 23/046; G01N 33/445

See application file for complete search history.

(56) References Cited

U.S. PATENT DOCUMENTS 8,368,878 B2 *   2/2013  Furness, III ............ G01J 3/463
                                                     356/448
9,042,516 B2 *   5/2015  Grossnickle ......... G01N 23/087
                                                     378/58
(Continued)

FOREIGN PATENT DOCUMENTS

JP    2005-308447 A    11/2005

*Primary Examiner* — Jonathan M Dunlap
(74) *Attorney, Agent, or Firm* — Birch, Stewart, Kolasch & Birch, LLP (57) ABSTRACT

A performance evaluation method for elastic material including rubber or elastomer, the method includes: a step of applying a strain to a test piece made of an elastic material to form at least one low-density portion inside the test piece; after forming the low-density portion, a step of obtaining projected images of the test piece by irradiating the test piece with X-rays at a predetermined first time and at a second time after the first time; a step of identifying the low-density portion based on the projected images at the first time; a step of identifying the low-density portion based on the projected images at the second time; a step of identifying a volume change of the at least one low-density portion between the first time and the second time; and a step of outputting the volume change as one of indicators of performance of the elastic material.

14 Claims, 7 Drawing Sheets

(51) Int. Cl.
 *G01N 9/24* (2006.01)
 *G01N 9/36* (2006.01)
 *G01N 23/046* (2018.01)
 *G01N 33/44* (2006.01)

(52) U.S. Cl.
 CPC ............... *G01N 2203/0062* (2013.01); *G01N 2203/0091* (2013.01); *G01N 2203/0641* (2013.01); *G01N 2203/0647* (2013.01)

(56) References Cited

U.S. PATENT DOCUMENTS

| | | | | |
|---|---|---|---|---|
| 10,639,932 | B2* | 5/2020 | Mashita | B60C 11/0008 |
| 10,654,316 | B2* | 5/2020 | Mashita | B60C 11/00 |
| 11,458,767 | B2* | 10/2022 | Mashita | C08L 9/00 |
| 12,203,904 | B2* | 1/2025 | Mashita | G01N 3/22 |
| 2012/0072154 | A1* | 3/2012 | Furness, III | G01J 3/46 |
| | | | | 702/82 |
| 2014/0098936 | A1* | 4/2014 | Grossnickle | G01N 23/087 |
| | | | | 428/209 |
| 2018/0290490 | A1* | 10/2018 | Mashita | B60C 1/0041 |
| 2018/0297404 | A1* | 10/2018 | Mashita | B60C 1/0016 |
| 2018/0304682 | A1* | 10/2018 | Mashita | B60C 1/0008 |
| 2022/0404253 | A1* | 12/2022 | Mashita | G01N 3/08 |
| 2023/0252663 | A1* | 8/2023 | Quintana | G06T 5/40 |
| | | | | 378/41 |
| 2023/0332990 | A1* | 10/2023 | Mashita | G01N 9/36 |

* cited by examiner

PERFORMANCE EVALUATION METHOD FOR ELASTIC MATERIAL

RELATED APPLICATION

This application claims the benefit of foreign priority to Japanese Patent Application No. JP2022-068454, filed Apr. 18, 2022, which is incorporated by reference in its entirety.

FIELD OF THE DISCLOSURE

The present disclosure relates to a performance evaluation method for elastic material.

BACKGROUND OF THE DISCLOSURE

Conventionally, as a method for evaluating the performance of an elastic material (for example, performance related to wear), a method of wearing an elastic material by an indoor wear tester such as a Ramborn wear tester has been proposed (e.g., Patent Document 1), for example.

PATENT DOCUMENT

[Patent document 1] Japanese Unexamined Patent Application Publication 2005-308447

SUMMARY OF THE DISCLOSURE

Unfortunately, there has been a problem that the performance results evaluated by the above method are not match the performance results of the actual product using the elastic material.

The present disclosure has been made in view of the above circumstances, and has a major object to provide a method capable of predicting performance of an elastic material.

In one aspect of the present disclosure, a performance evaluation method for elastic material including rubber or elastomer, the method includes:
 a step of applying a strain to a test piece made of an elastic material to form at least one low-density portion inside the test piece;
 after forming the at least one low-density portion, a step of obtaining projected images of the test piece by irradiating the test piece with X-rays at a predetermined first time and at a second time after the first time;
 a step of identifying the at least one low-density portion based on the projected images at the first time;
 a step of identifying the at least one low-density portion based on the projected images at the second time;
 a step of identifying a volume change of the at least one low-density portion between the first time and the second time; and
 a step of outputting the volume change as one of indicators of performance of the elastic material.

DETAILED DESCRIPTION OF THE DISCLOSURE

Hereinafter, one or more embodiments of the present disclosure will be described with reference to the drawings.

It should be noted that the drawings contain exaggerated expressions and expressions that differ from the dimensional ratio of the actual structure in order to aid understanding of the content of the disclosure. Further, throughout the embodiments, the same or common elements are given the same reference numerals, and duplicate explanations are omitted. Furthermore, note that the specific configurations shown in the embodiments and drawings are for understanding the contents of the present disclosure, and the present disclosure is not limited to the specific configurations shown in the drawings.

In the performance evaluation method for elastic material in accordance with the present embodiment (hereinafter, may be simply referred to as "performance evaluation method"), performance of an elastic material including rubber or elastomer can be evaluated.

[Elastic Material]

The elastic material is not particularly limited as long as it contains rubber or elastomer. The elastic material according to the present embodiment includes rubber obtained using one or more kinds of conjugated diene compounds. Note that the elastic material is not limited to such rubber. Further, as rubber (an elastic material), for example, rubber for tires can be selected. As an example of the performance evaluated by the method of the present embodiment, the performance related to wear (e.g., wear resistance performance) can be selected.

[Performance Evaluation System for Elastic Material]

Figure 1:
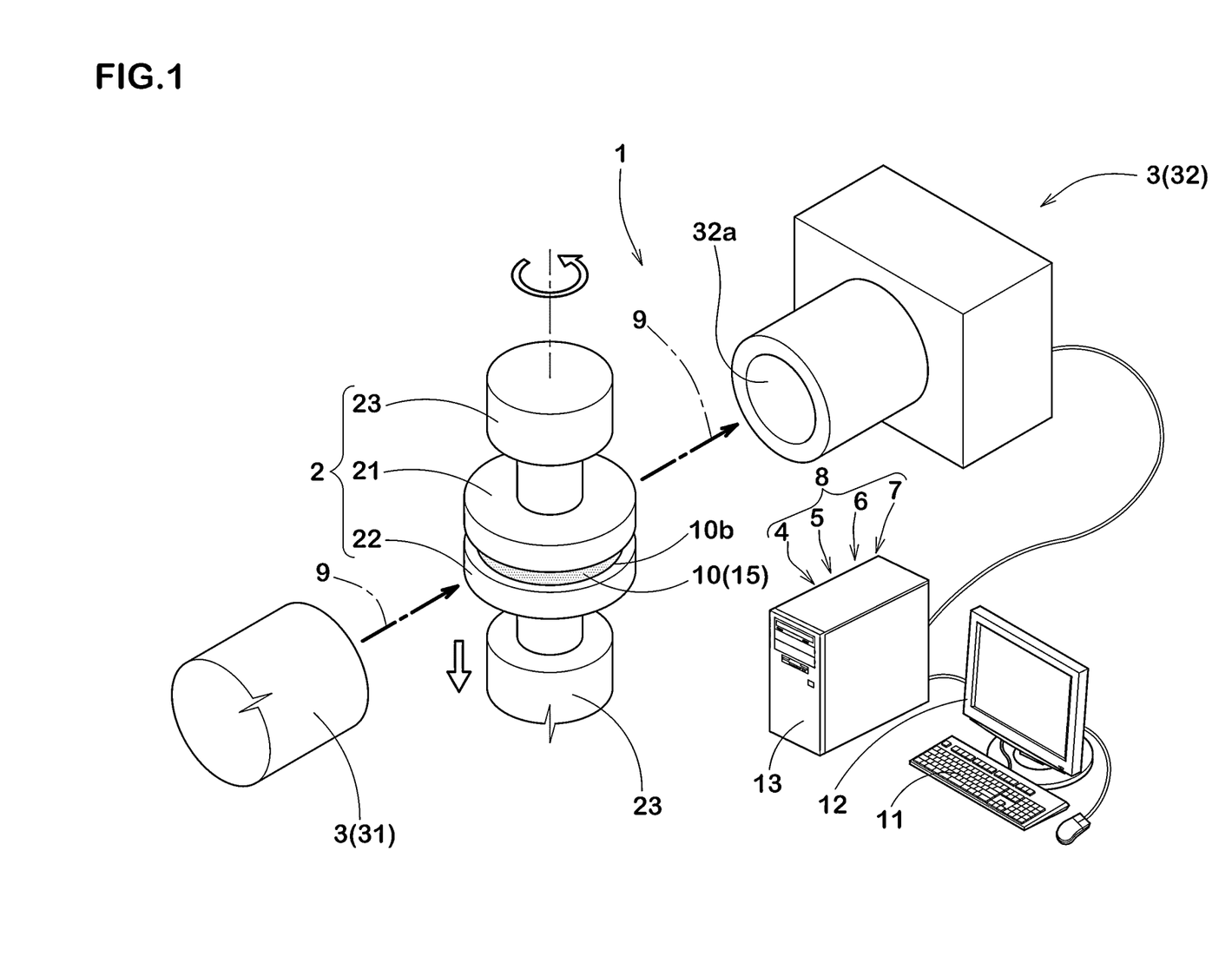
FIG. 1 is a perspective view of a performance evaluating system for elastic material in accordance with the present embodiment.

As the performance evaluation method of the present embodiment, a performance evaluation system for elastic material (hereinafter, may be simply referred to as "performance evaluation system") 1 can be used. FIG. 1 illustrates a perspective view of the performance evaluation system 1 in accordance with the present embodiment.

The performance evaluation system 1 is for evaluating performance of elastic material. The performance evaluation system 1 according to the present embodiment includes a strain applying device 2, an imaging unit 3, a low-density portion identification unit 4, a volume change identification unit 5, a volume change output unit 6, and an evaluation unit 7.

[Strain Applying Device]

The strain applying device 2 according to the present embodiment is for applying a strain to a test piece 10 made of an elastic material. The strain applying device 2 according to the present embodiment includes a pair of jigs 21 and 22 to which the test piece 10 is fixed, and drive units 23 that relatively move the jigs 21 and 22 to apply a strain to the test piece 10.

One of the drive units 23, under a condition that one of the jigs 21 is fixed, move the other one of the jigs 22 in a direction that the jigs 21 and 22 are separated from one another. The drive units 23 according to the present embodiment move the other one of the jigs 22 in the axial direction of the test piece 10 which has a columnar shape. Thus, the test piece 10 is stretched in the axial direction and receives a tensile strain.

The strain or the load that applies to the test piece 10 is measured using a load cell (not illustrated) and the like. The position and format of the load cell may be arbitrary. Using such a strain applying device 2, a predetermined strain or load can be applied to the test piece 10. The drive units 23 according to the present embodiment can also rotate the test piece 10 as well as the jigs 21 and 22 around the central axis of the test piece 10.

[Imaging Unit]

The imaging unit 3 according to the present embodiment can obtain projected images of the test piece 10 by irradiating X-rays 9 (indicated by a single dotted line in FIG. 1) to the test piece 10 being strained. The imaging unit 3 according to the present embodiment includes an X-ray tube 31 that irradiates X-rays 9 and a detector 32 that detects X-rays 9 and converts them into electrical signals. The detector 32 includes a phosphor 32a for converting X-rays 9 into visible light. The imaging unit 3 can obtain projected images of the test piece 10 over the entire circumference by taking multiple projected images with the test piece 10 while the test piece 10 is rotated around the central axis.

[Volume Change Identification Unit/Evaluation Unit]

Figure 2:
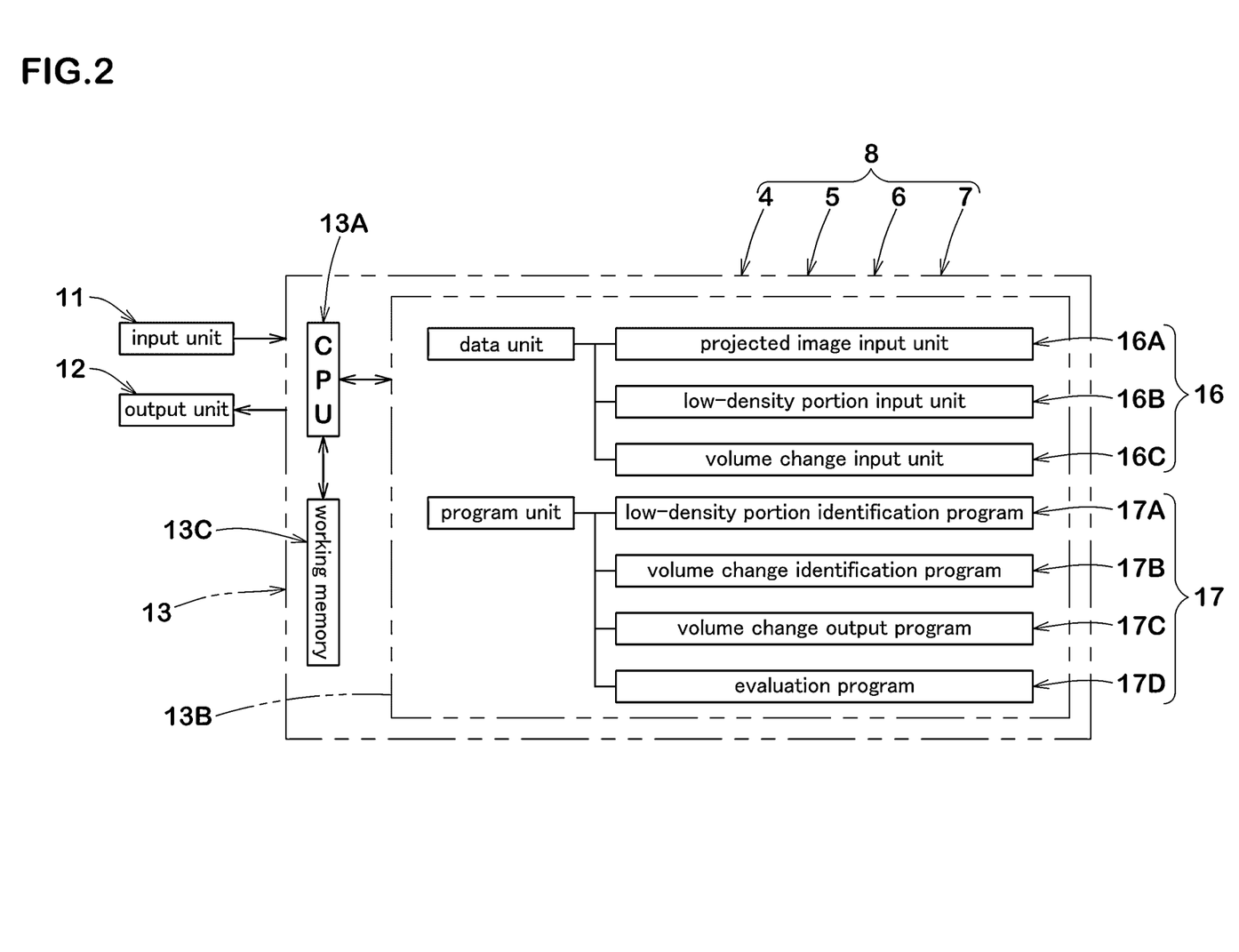
FIG. 2 is a block diagram of a computer in accordance with the present embodiment.

In the present embodiment, the low-density portion identification unit 4, the volume change identification unit 5, the volume change output unit 6, and the evaluation unit 7 are configured as components of a computer 8. FIG. 2 illustrates a block diagram of the computer 8 in accordance with the present embodiment.

As illustrates in FIG. 1 and FIG. 2, the computer 8 according to the present embodiment includes an input unit 11 as an input device, an output unit 12 as an output device, and an arithmetic processing unit 13.

For the input unit 11, a keyboard or mouse may be used, for example. For the output unit 12, a display device or printer may be used, for example. As illustrated in FIG. 2, the arithmetic processing unit 13 may be configured to include a central processing unit (CPU) 13A which performs various operations, a storage unit 13B for storing data, programs, etc., and a working memory 13C.

The storage unit 13B, for example, is a device which includes a non-volatile information storage device including magnetic disks, optical disks, SSDs, etc. The storage unit 13B includes a data unit 16 and a program unit 17.

In the present embodiment, the data unit 16 includes a projected image input unit 16A, a low-density portion input unit 16B, and a volume change input unit 16C. The data input to these will be explained in the processing procedures of the performance evaluation method described later.

In the present embodiment, the program unit 17 is configured as a computer program. The program unit 17 according to the present embodiment includes a low-density portion identification program 17A, a volume change identification program 17B, a volume change output program 17C, and an evaluation program 17D. These programs 17A to 17D can be executed by the central processing unit 13A to make the computer 8 function as the low-density identification unit 4, the volume change identification unit 5, the volume change output unit 6, and the evaluation unit 7, respectively. These functions are explained in the processing procedures of the performance evaluation method described later.

[Performance Evaluation Method for Elastic Material (First Embodiment)]

Figure 3:
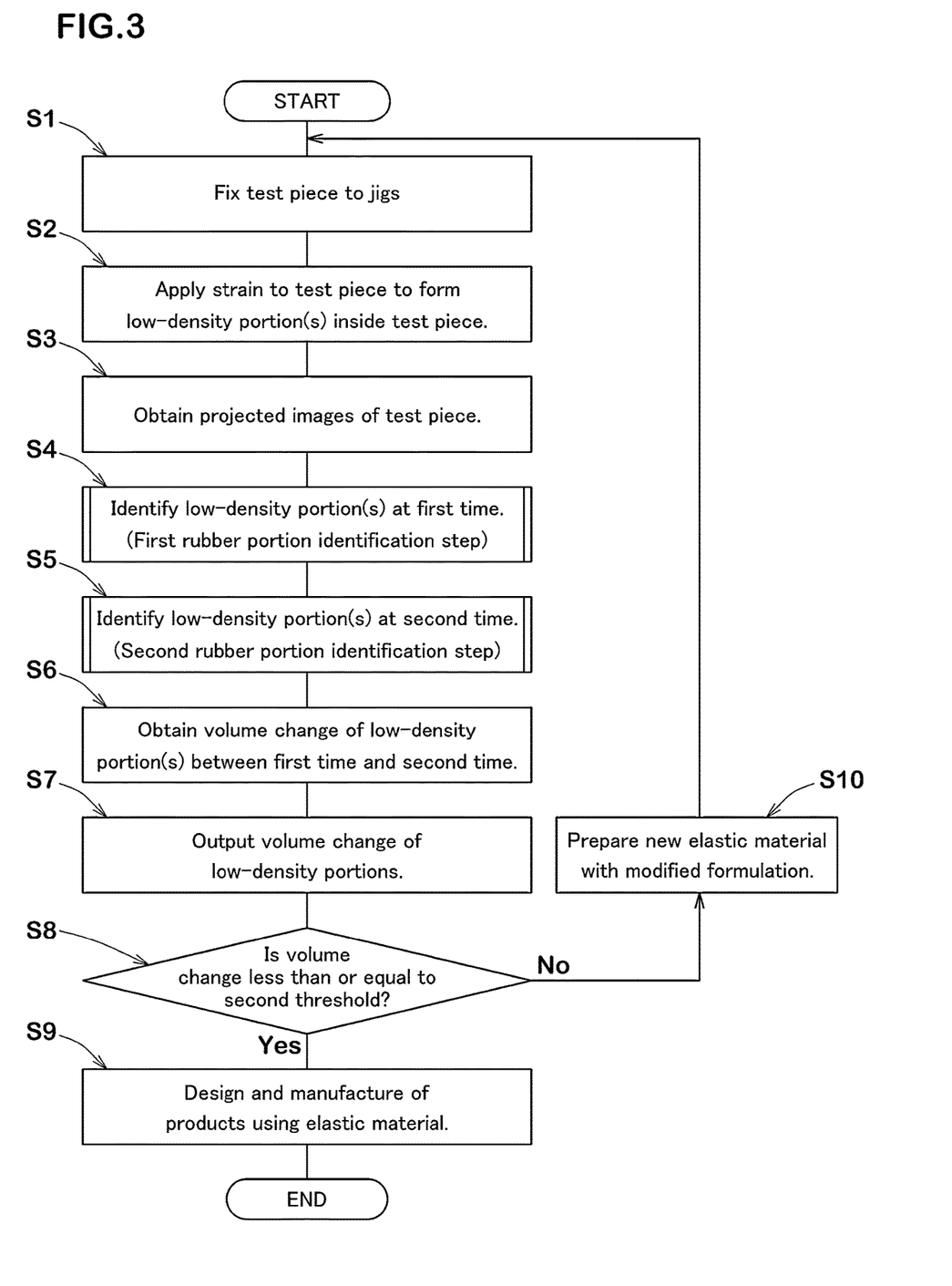
FIG. 3 is a flowchart showing processing procedures of a performance evaluating method for the elastic material in accordance with the present embodiment.

Next, the processing procedures of the performance evaluation method of the present embodiment will be explained. FIG. 3 is a flowchart showing the processing procedures of the performance evaluation method for elastic material of the present embodiment.

[Process of Fixing Test Piece]

In the performance evaluation method of the present embodiment, first, the test piece 10 is fixed to the jigs 21 and 22 as shown in FIG. 1 (Step S1). In the present embodiment, the above-mentioned elastic material 15 having a uniform density distribution is used for the test piece 10. For example, the test piece 10 is formed in a columnar shape same as the Patent Document, Japanese Unexamined Patent Application Publication 2017-83182. The details of the test piece 10 and the procedures for fixing the test piece 10 to the jigs 21 and 22 are as described in Patent Document, Japanese Unexamined Patent Application Publication 2017-83182, which is incorporated by reference.

[Forming Low-Density Portion(s)]

Next, in the performance evaluation method according to the present embodiment, as illustrated in FIG. 3, the test piece 10 is applied a strain (shown in FIG. 1) to form at least one low-density portion inside the test piece 10 (Step S2).

Figure 4A:
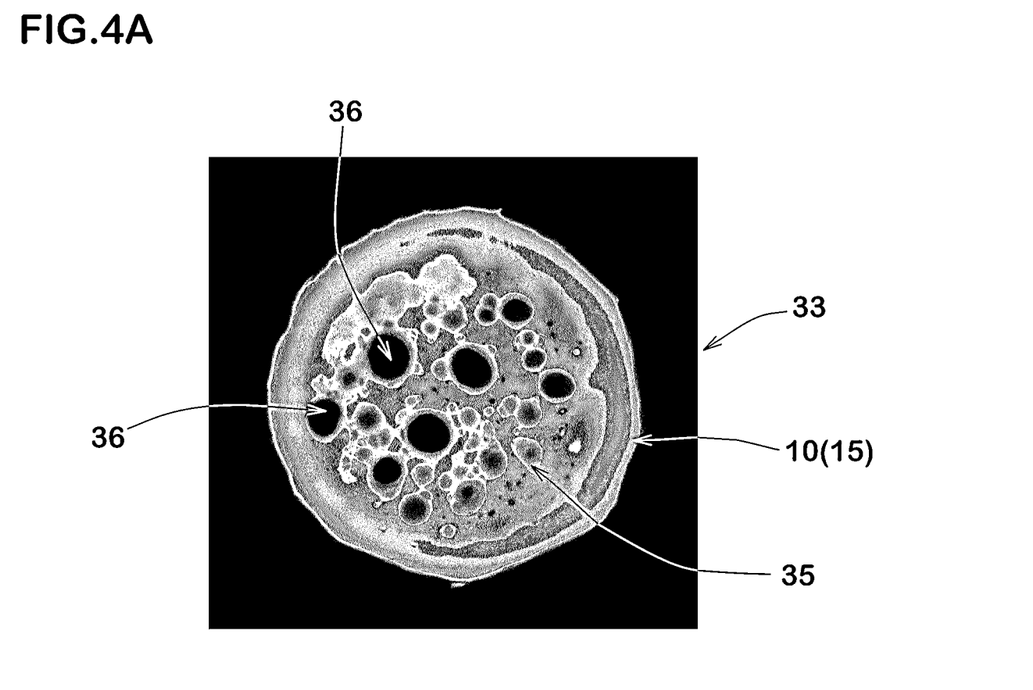
FIG. 4A is a tomographic image of a test piece subjected to strain obtained at the first time.
Figure 4B:
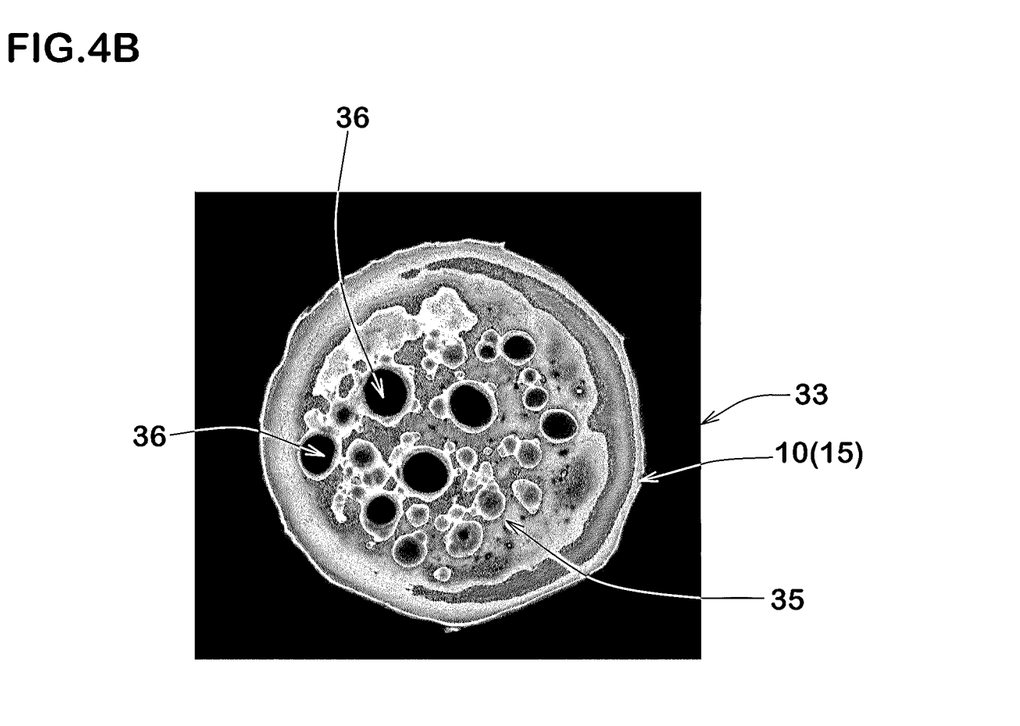
FIG. 4B is a tomographic image of the test piece subjected to strain obtained at the second time.

In Step S2, as illustrated in FIG. 1, the jigs 21 and 22 of the strain applying device 2 are relatively moved in the axial direction of the columnar test piece 10 in the direction away from each other using the drive units 23 of the strain applying device 2. Thus, due to step S2, the test piece 10 is stretched so that the test piece 10 receives a tensile strain. FIGS. 4A and 4B show tomographic images 33 of the test piece 10 subjected to strain. FIG. 4A shows the tomographic image 33 of the test piece 10 obtained at the first time, and FIG. 4B shows the tomographic image 33 of the test piece 10 obtained at the second time.

In Step S2 of the present embodiment, the test piece 10 is subjected to a strain, which causes a local stress concentration inside the test piece 10, and the polymer (not shown in the figures) constituting the elastic material 15 moves to avoid the stress concentration. Thus, as shown in FIGS. 4A and 4B, at least one low-density portion 35 (e.g., a plurality of low-density portions 35) can be formed inside the test piece 10. The low-density portions 35 are defined as portions where the density of the elastic material 15 is equal to or more than 0.1 and less than 0.8 when the test piece 10 is subjected to strain, where the average density of the elastic material 15 before strained is 1.0.

In Step S2 according to the present embodiment, a tensile strain is applied to the test piece 10, for example. Thus, one or more low-density portions 35 can be generated efficiently in the elastic material (the test piece 10) as compared to the case where other kinds of strain, e.g., compressive strain and shear strain, are applied.

In Step S2, it is preferable that the strain given to the test piece 10 reaches a predetermined first threshold value. This may give the test piece 10 a certain strain (a strain of the first threshold value), so that a quantitative performance evaluation can be performed. In the present embodiment, after the strain reaches the first threshold in Step S2, the strain (the first threshold value) is maintained in the subsequent Step S3 (obtaining the projected images of the test piece 10).

In the present embodiment, the strain (the first threshold value) is calculated that a displacement of the strained test piece 10 (the displacement of the test piece 10 from before receiving a strain) is divided by the axial length of the test piece 10 before receiving the strain (a reference length in the extension direction of the test piece 10).

In the present embodiment, the first threshold value is preferably set equal to or more than 0.2. By setting the first threshold value equal to or more than 0.2, one or more low-density portions 35 (shown in FIGS. 4A and 4B) necessary for evaluating the performance of the elastic material 15 can be formed effectively. On the other hand, when the first threshold value becomes larger than necessary, the strain in the test piece 10 becomes larger and many of the low-density portions 35 may develop into voids 36 (e.g., fracture). In such a case, the low-density portions 35 may disappear and the evaluation of the performance of the elastic material 15 based on the low-density portions 35 may be difficult. From this point of view, the first threshold value is preferably set equal to or less than 1.0. Note that the void 36 is defined as the portion where the density of the elastic material 15 is equal to or more than 0.0 and less than 0.1 when the test piece 10 is subjected to strain, where the average density of the elastic material 15 before strained is 1.0.

[Imaging Step]

Next, in the performance evaluation method according to the present embodiment, as shown in FIG. 3, the strained test piece 10 is irradiated with X-rays, and projected images of the test piece 10 are obtained (Step S3). In Step S3 according to the present embodiment, after forming the low-density portions 35 (shown in FIGS. 4A and 4B), projected images of the test piece 10 are obtained at a predetermined first time and at the second time after a predetermined time elapsed from the first time. The time at which the projected images are obtained is not limited as long as it includes the first time and the second time. For example, the projected images may be obtained at multiple times including the first and the second time. The projected images in the present embodiment are obtained by a computer tomography method.

In step S3 according to the present embodiment, first, as shown in FIG. 1, the test piece 10 is irradiated with X-rays 9 from the X-ray tube 31. The X-rays 9 pass through the test piece 10 and are detected by the detector 32. The detected X-rays 9 are converted into electrical signals which are output to the computer 8. The computer 8 processes these electrical signals to obtain projected images of the test piece 10.

In step S3 according to the present embodiment, a plurality of projected images (rotation series images) is obtained by rotating the test piece 10 around the axial direction. The plurality of projected images (rotation series images) is reconstructed by the computer tomography method, and three-dimensional tomographic images of the test piece 10 as shown in FIGS. 4A and 4B are obtained. These tomographic images 33 show a cut plane of the test piece 10 in a plane that intersects perpendicular to the axial direction of the test piece 10 shown in FIG. 1. In FIGS. 4A and 4B, the voids 36 are shown in black. On the other hand, the low-density portions 35 are shown in lighter black (gray) than that of the voids 36.

The brightness of X-rays 9 can be set as appropriate. The brightness of X-rays 9 may be greatly related to the S/N ratio of the X-ray scattering data. When the brightness of the X-rays 9 becomes low, the signal intensity tends to be weaker than the X-ray statistical error, and it may be difficult to obtain data with a sufficiently high S/N ratio even if the measurement time is lengthened. From this point of view, the brightness of the X-rays 9 (photons/s/mrad$^2$/mm$^2$/0.1% bw) is preferably equal to or more than $10^{10}$, more preferably equal to or more than $10^{12}$.

For example, the decay time of the phosphor 32a (shown in FIG. 1) for converting X-rays 9 to visible light can be set a range similar to the above Patent Document (Japanese Unexamined Patent Application Publication 2017-83182). The decay time can be set appropriately according to, for example, the shutter interval time of the imaging unit 3.

In Step S3 of the present embodiment, after the low-density portions 35 (shown in FIGS. 4A and 4B) are formed in Step S2, the projected images of the test piece 10 are obtained at the first time and the second time (in this example, at multiple times including the first time and the second time). Thus, in Step S3, projected images of the test piece 10, in which the size (volume) of the low-density portions 35 change with the progress of the movement of the polymer (not shown) constituting the elastic material 15, can be obtained at the first time and the second time.

The first time can be set as appropriately as long as the time after one or more low-density portions 35 are formed in the test piece 10. The first time is preferably set to the time when the strain applied to the test piece 10 reaches the first threshold value. Thus, in Step S3, a projected image of the test piece 10 can be obtained immediately after a constant strain (the strain maintained at the first threshold) is applied (in this case, the low-density portions 35 necessary for performance evaluation are formed).

The second time can be any time after the first time. The second time is preferably set to the time after 0.1 to 1200 seconds from the first time. By setting the second time at the time that is more than 0.1 second after the first time, the volume of the low-density portions 35 (shown in FIG. 4B) at the second time can be changed (increased) from the volume of the low-density portions 35 (shown in FIG. 4A) at the first time. On the other hand, if the second time is set at the time equal to or less than 1200 seconds after the first time, the time required to obtain the projected images at the second time can be suppressed to be larger than necessary. From this viewpoint, the second time is preferably the time when 1.0 second or more have elapsed from the first time, and preferably the time when 800 seconds or less have elapsed from the first time.

In the present embodiment, the strain applied to the test piece 10 is maintained at the first threshold value during the time period that includes the first time and the second time. As a result, the projected images of the test piece 10 in which the volume of the low-density portions 35 changes based on a certain strain can be obtained at the first time and the second time. The projected images of the test piece 10 obtained at the first time and the second time are input to the projected image input unit 16A (shown in FIG. 2) of the computer 8.

[Identification of Low-Density Portions at First Time]

Next, in this performance evaluation method, the low-density portions 35 are identified based on the projected images of the test piece 10 (shown in FIG. 1) at the first time (first rubber portion identification step S4), as shown in FIG. 3.

Figure 5:
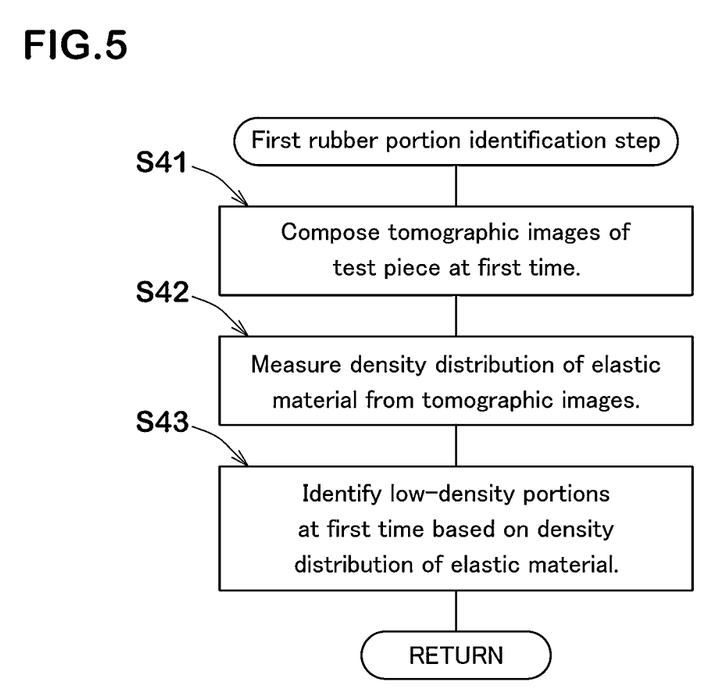
FIG. 5 is a flowchart showing procedures of the first rubber portion identifying step.

In the first rubber portion identification step S4 according to the present embodiment, first, as shown in FIG. 2, the projected images of the test piece 10 (not shown) at the first time input to the projected image input unit 16A and the low-density portion identification program 17A are read into the working memory 13C. Then, the low-density portion identification program 17A is executed by the arithmetic unit 13A, so that the computer 8 can function as the low-density identification unit 4 for identify the low-density portions 35 (shown in FIG. 4A) at the first time. FIG. 5 illustrates a flowchart showing a processing procedure of the first rubber portion identification step S4 according to the present embodiment.

[Composition of Tomographic Images]

In the first rubber portion identification step S4 according to the present embodiment, tomographic images 33 (shown in FIG. 4A) of the test piece 10 are constructed using the projected images of the test piece 10 (shown in FIG. 1) at the first time (Step S41). In Step S41 of the present embodiment, using the projected images of the test piece 10, a plurality of tomographic images 33 are obtained, which are cross-sectional images of the test piece 10 at arbitrary planes intersecting perpendicularly to the axial direction of the test piece 10.

In this embodiment, the tomographic images 33 are obtained at arbitrary intervals between one end (not shown) and the other end 10b in the axial direction of the test piece 10 shown in FIG. 1. The interval for example, ranges from 2 to 10 μm (5 μm in this embodiment). The number of tomographic images 33 can be set as desired. The number of images in this case is from 5 to 20 (10 in this embodiment). FIG. 4A shows a representative image of one tomographic image composed from the projected images at the first time.

[Measurement of Density]

Next, in the first rubber portion identification step S4 according to the present embodiment, the density distribution of the elastic material 15 is measured from a plurality of tomographic images 33 (shown in FIG. 4A) (Step S42). In Step S42 of the present embodiment, first, in the area of the test piece 10 displayed in each of the tomographic image 33, brightness values of the minute regions (e.g., each pixel) that constitute the tomographic image 33 are obtained.

In the present embodiment, the higher the brightness value, the greater the density of the elastic material 15. For example, the brightness value of a minute area indicating the void 36 is the lowest. Therefore, there is a proportional relationship between the brightness value and the density.

Next, in step S42 according to the present embodiment, the ratio of brightness value is calculated for each of the minute regions (pixels in this embodiment) that constitute the tomographic image 33. In the present embodiment, the ratio of the brightness value of each minute region is determined such that the brightness value of the elastic material 15 before receiving strain (i.e., without the low-density portions 35 or the voids 36) is 1.0, and the brightness value of the minute region without existing the elastic material 15 (i.e., the lowest brightness value) is 0.0. Each ratio of such a brightness value is defined as the normalized density (i.e., the ratio to the density of the elastic material before receiving strain). In the minute regions of each tomographic image 33, the density distribution of the elastic material 15 can be measured by determining the ratio of brightness values.

Next, the first rubber portion identification step S4 according to the present embodiment, the low-density portions 35 at the first time are identified based on the density distribution of the elastic material 15 (Step S43). As mentioned above, the low-density portions 35 are portions whose density is equal to or more than 0.1 and less than 0.8 times the density of the elastic material before the strain is applied. Thus, in step S43 of the present embodiment, the regions that are displayed by the minute regions (pixels) of each tomographic image 22 (shown in FIGS. 4A and 4B as an example) having the ratio of brightness values (normalized density) equal to or more than 0.1 and less than 0.8 are detected as the low-density portions 35.

To detect the low-density portions 35, commercially available image processing software (e.g., Photoshop (registered trademark) manufactured by Adobe) or the like can be used. The identified low-density portions 35 (i.e., the minute regions with the ratio of brightness values equal to or more than 0.1 and less than 0.8) at the first time are input to the low-density portion input unit 16B (shown in FIG. 2) of the computer 8.

[Identification of Low-Density Portions at Second Time]

Next, in this performance evaluation method, the low-density portions 35 (shown in FIG. 4B) are identified based on the projected images of the test piece 10 (shown in FIG. 1) at the second time (second rubber portion identification step S5), as shown in FIG. 3.

Figure 6:
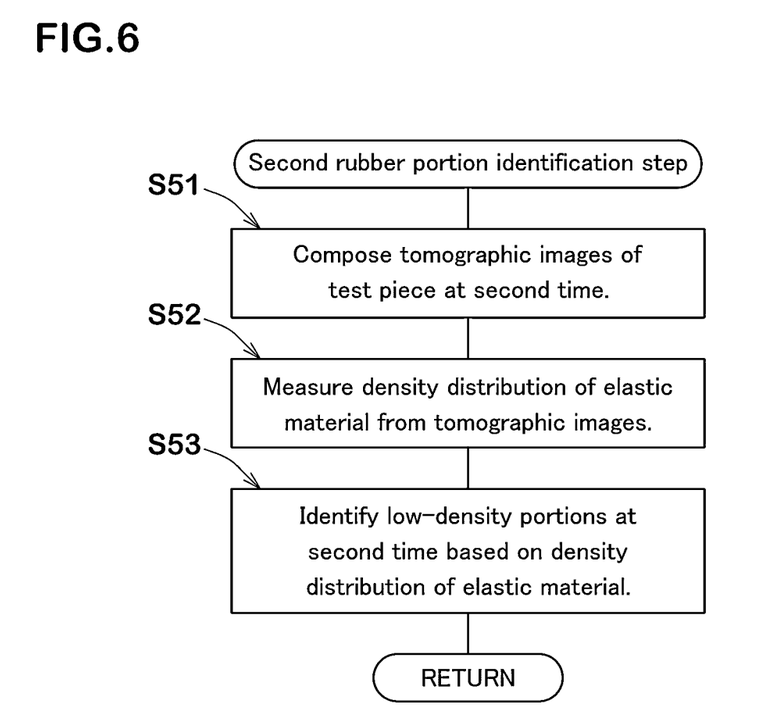
FIG. 6 is a flowchart showing procedures of the second rubber portion identifying step.

In the second rubber portion identification step S5 according to the present embodiment, first, as shown in FIG. 2, the projected images of the test piece 10 (not shown) at the second time input to the projected image input unit 16A and the low-density portion identification program 17A are read into the working memory 13C. Then, the low-density portion identification program 17A is executed by the arithmetic unit 13A, so that the computer 8 can function as the low-density identification unit 4 for identify the low-density portions 35 at the second time. FIG. 6 illustrates a flowchart showing a processing procedure of the second rubber portion identification step S5 according to the present embodiment.

In the second rubber portion identification step S5, similar to the first rubber portion identification step S4 shown in FIG. 5, a plurality of tomographic images 33 (shown in FIG. 4B) of the test piece 10 is constructed using the projected images of the test piece 10 at the second time (Step S51). Next, in the second rubber portion identification step S5, the density distribution of the elastic material 15 is measured from the plurality of tomographic images 33 (as shown in FIG. 4B as an example) (Step S52), and the low-density portions 35 are identified based on the identified density distribution of the elastic material 15 (Step S53). The identified low-density portions 35 (i.e., the minute regions with the ratio of brightness values equal to or more than 0.1 and less than 0.8) at the second time are input to the low-density portion input part 16B (shown in FIG. 2) of the computer 8.

[Volume Change Identification Step]

Next, as shown in FIG. 3, in the performance evaluation method, the volume change between the low-density portions 35 at the first time (shown in FIG. 4A) and the low-density portions 35 at the second time (shown in FIG. 4B) is identified (Step S6).

As shown in FIG. 2, in Step S6 according to the present embodiment, the low-density portions at the first time and the low-density portion at the second time, which are input in the input unit 16B, are read into the working memory 13C. Then, the volume change identification program 17B is loaded into the working memory 13C. Then, the volume change identification program 17B is executed by the arithmetic unit 13A, and the computer 8 can function as the volume change identification unit 5 for identifying the volume change.

In Step S6 of the present embodiment, the volume of the low-density portions 35 at the first time is obtained. In the present embodiment, in each of the tomographic images 33 at the first time (shown in FIG. 4A), the product of the total area of the low-density portions 35 and the interval at which the tomographic images 33 were acquired (in this example, 5 μm), and the product is taken as the volume of the low-density portions 35 in each of the tomographic images 33. Then, the volumes of the low-density portions 35 of these tomographic images 33 are added together to obtain the volume V0 of the low-density portions 35 at the first time.

Next, in Step S6 of the present embodiment, the volume of the low-density portions 35 at the second time is obtained. In the present embodiment, in each of the tomographic images 33 at the second time (shown in FIG. 4B), the product of the total area of the low-density portions 35 and the interval at which the tomographic images 33 were acquired (in this example, 5 μm), and the product is taken as the volume of the low-density portions 35 in each of the tomographic images 33. Then, the volumes of the low-density portions 35 of these tomographic images 33 are added together to obtain the volume Vt of the low-density portions 35 at the second time.

Next, in Step S6 of the present embodiment, the volume change between the low-density portions 35 at the first time (shown in FIG. 4A) and the low-density portions 35 at the second time (shown in FIG. 4B) is identified. In the present embodiment, the ratio Vt/V0 between the volume V0 of the low-density portions 35 at the first time and the volume Vt of the low-density portions 35 at the second time is obtained. The ratio Vt/V0 is identified as the volume change of the low-density portions 35.

The volume change of the low-density portions 35 indicates the increase (growth) of the volume of the low-density portions 35 between the first time and the second time. As a result of extensive research, the inventors have found that as the volume of the low-density portions 35 increases, one or more low-density portions 35 lead to voids (fractures) 36, and there has been a certain correlation between the volume change (Vt/V0) of the low-density portions 35 between the first time and the second time and the performance of the elastic material 15. That is, in the elastic material 15 with a small volume change (Vt/V0) of the low-density portions 35, the internal structure (polymer bonds not shown in FIG.) is less likely to break, and there is a tendency that the performance of the elastic material 15 is good.

In this method of performance evaluation, the volume change of the low-density portions 35 (Vt/V0) is obtained as one of the indicators of the performance of the elastic material 15. This makes it possible to evaluate the performance of the elastic material 15. Furthermore, in this method of performance evaluation, for example, when evaluating the performance of elastic material 15 in which the low-density portions 35 tends to be formed earlier than the voids 36, the performance can be evaluated based on the low-density portions 35, and it is not necessary to take much time to form the voids 36. Thus, the performance evaluation method of can evaluate the performance of the elastic material 15 in short time. The volume change (Vt/V0) of the low-density portions 35 is input to the volume change input unit 16C of the computer 8 shown in FIG. 2.

[Output Low-Density Portions]

Next, in the performance evaluation method of the embodiment, as shown in FIG. 3, the volume change (Vt/V0) of the low-density portions 35 is output as one of the performances of the elastic material 15. (Step S7).

In Step S7 of the present embodiment, as illustrated in FIG. 2, the volume change (ratio Vt/V0) of the low-density portions 35 input to the volume change input unit 16C and the volume change output program 17C are read into the working memory 13C. Then, by executing the volume change output program 17C by the central processing unit 13A, the computer 8 can function as the volume change output unit 6 for outputting the volume change (Vt/V0).

The volume change (Vt/V0) of the low-density portions 35 can be output as appropriate. The volume change (Vt/V0) may be displayed, for example, on the display device that constitutes the output unit 12, or may be printed on a printer or the like. This makes it possible to inform the operator of the volume change (Vt/V0). In addition to the volume change (Vt/V0), cross-sectional images of the test piece at the first time and the second time (FIGS. 4A and 4B) may be output together.

As mentioned above, the volume change (ratio Vt/V0) of the low-density portions 35 is the volume increase (growth) of the low-density portions 35 between the first time and the second time. The performance of the elastic material 15 (shown in FIG. 1) is better the smaller its volume change (Vt/V0). Thus, by outputting such a volume change (Vt/V0) as an index of the performance of the elastic material 15, it is possible to evaluate the performance of the elastic material 15.

[Evaluation Step]

Next, in the performance evaluation method of the present embodiment, as shown in FIG. 3, based on the volume change (Vt/V0) of the low-density portions 35, the performance of the elastic material 15 (shown in FIG. 1) is evaluated (Step S8).

In step S8 of the present embodiment, as shown in FIG. 2, the volume change (Vt/V0) of the low-density portions 35 input to the volume change input unit 16C and the evaluation program 17D are read into the working memory 13C. Then, the evaluation program 17D is executed by the central processing unit 13A, so that the computer 8 can function as the evaluation unit 7 for evaluating the performance of the elastic material 15.

In step S8 according to the present embodiment, the volume change of the low-density portions 35 is compared with a predetermined second threshold value. As mentioned above, an elastic material 15 with a small volume change (Vt/V0) has good performance (in this embodiment, performance related to wear) of the elastic material 15. From this point of view, in Step S8 according to the present embodiment, when the volume change of the low-density portions 35 is equal to or less than the second threshold value, it may be evaluated that the performance of the elastic material 15 can be good.

The second threshold value can be set as appropriate according to, for example, various performances (performance related to wear in this embodiment) required for the elastic material 15. The second threshold of the embodiment is set to 1.0 to 3.0 (2.0 in this embodiment).

In step S8, when the volume change of the low-density portions 35 is equal to or less than the second threshold value (2.0 in this embodiment) ("Yes" in Step S8), the performance of the elastic material 15 is evaluated to be good. In this case, a product (for example, a tire) using the elastic material 15 (rubber) is designed and manufactured (step S9). This makes it possible to reliably manufacture products with excellent performance (in this embodiment, performance related to wear).

On the other hand, in Step S8, when the volume change of the low-density portions 35 is larger than the second threshold value (2.0 in this embodiment) ("No" in Step S8), it is evaluated that the performance of the elastic material 15 is not good. In this case, a new elastic material with a different composition is produced (Step S10), and Step S1 to Step S8 are carried out again. This makes it possible to reliably produce one or more elastic materials 15 with excellent performance (in this example, performance related to wear).

[Performance Evaluation Method of Elastic Material (Second Embodiment)]

In the previous embodiment, the performance regarding wear (wear resistance performance) was evaluated, but the present disclosure is not limited to such an aspect. For example, based on the volume change of the low-density portions 35, the tear resistance performance and crack resistance performance of the elastic material 15 may be evaluated.

[Performance Evaluation Method of Elastic Material (Third Embodiment)]

Figure 7:
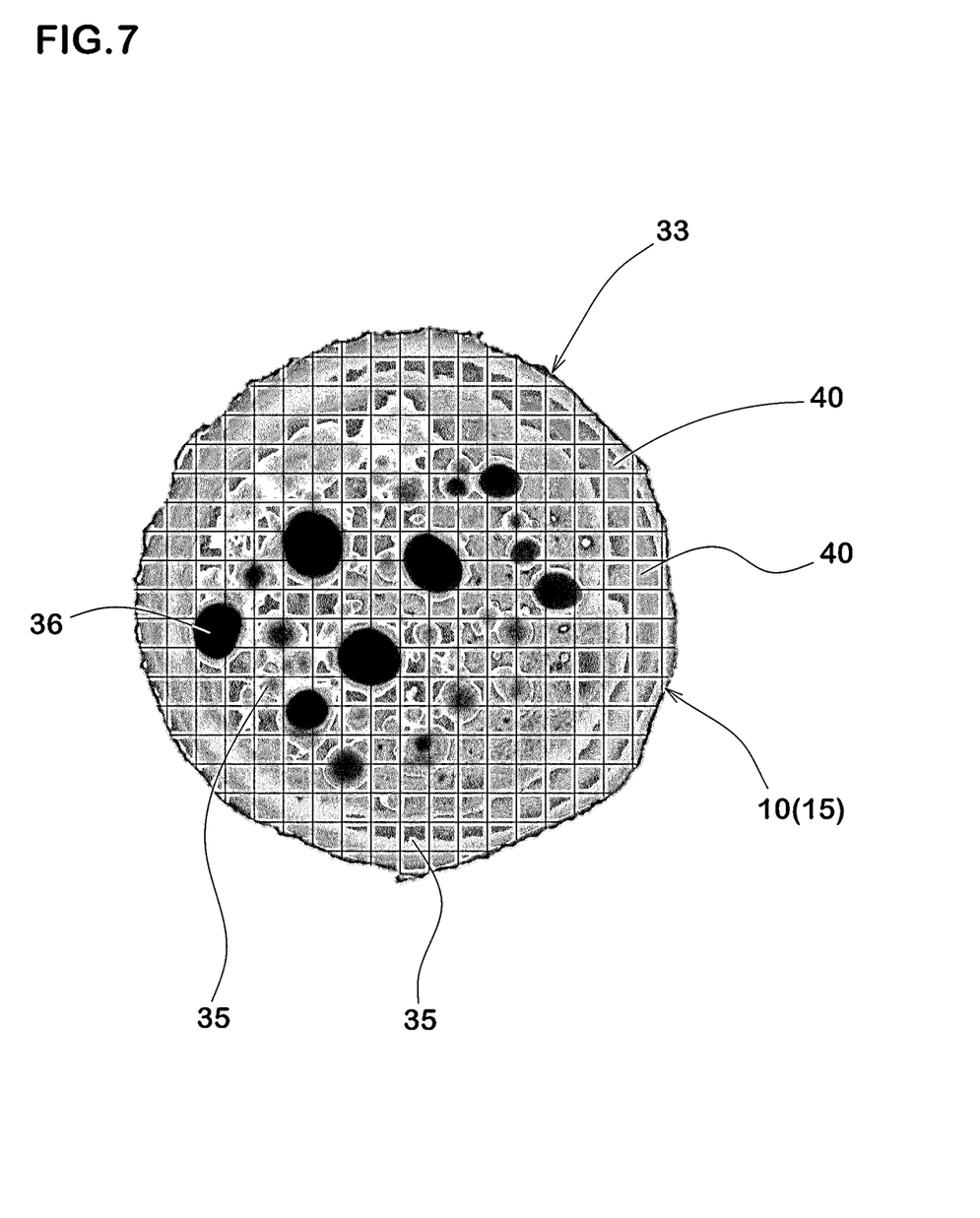
FIG. 7 is a tomographic image virtually segmented into multiple regions.

In the previous embodiments, the low-density portions 35 were identified for each minute region (each pixel) of the tomographic images 33 shown in FIGS. 4A and 4B, but the present disclosure is not limited to such an aspect. For example, the tomographic images 33 may be virtually divided into a plurality of regions having a size larger than that of the above-mentioned minute regions (the pixels), and the low-density portions 35 may be identified for each of these regions. FIG. 7 shows a tomographic image 33 virtually divided into a plurality of regions 40. In FIG. 7, the background of the tomographic image 33 is omitted.

Although the regions 40 in this embodiment is divided into grids, the present disclosure is not limited to such an aspect. In the first rubber portion identification step S4 and the second rubber portion identification step S5 of this embodiment, the average values of the ratios of the brightness values of the minute regions (pixels) forming each region 40 are identified in the plurality of regions 40. Then, among the plurality of regions 40, the region 40 where the average value of the ratio of the minute regions (pixels) is 0.1 or more and less than 0.8 is identified as the low-density portion 35.

From the first time to the second time, the number of regions 40 to be identified as the low-density portions 35 increases as the number of minute regions (pixels) where the brightness value ratio is equal to or more than 0.1 and less than 0.8 increases. Thus, in the Step S6 of identifying the volume change, the ratio Vt/V0 of the volume (total volume) Vt of region 40 identified as the low-density portions 35 at the second time to the volume (total volume) V0 of the regions 40 identified as the low-density portions 35 at the first time is obtained.

Thus, in this embodiment, the tomographic images 33 are virtually divided into the regions 40 larger than the minute regions (pixels), so that, for example, the tendency of occurrence of the low-density portion 35 can be evaluated for each region 40. This makes it possible to easily identify a portion (region 40) where the low-density portion 35 is likely to occur in the test piece 10.

While the particularly preferable embodiments in accordance with the present disclosure have been described in detail, the present disclosure is not limited to the illustrated embodiments, but can be modified and carried out in various aspects within the scope of the disclosure.

Working Example

For elastic materials A to C, the wear-related performance (wear resistance performance) was evaluated based on the volume change of the low-density portions which was obtained using the method of the present disclosure. Further, pneumatic tires with tread portions made of the above elastic materials A to C were prepared, and their tread wear resistance was evaluated by an actual vehicle running test. Then, the correlation between the evaluation of the wear resistance performance by the present disclosure and the evaluation of the wear resistance performance by the actual vehicle running test was verified (Example).

For comparison, the wear resistance performance of the elastic materials A to C was evaluated using a Ramborn tester, and then the correlation between the results and the evaluation of wear resistance performance by the actual vehicle running test was verified (comparative example).

The reagents used are as follows.
1. Polymer (1) (one modified group; Polymer polymerized in accordance with JP2010-116554A)
2. Polymer (2): (two modified groups; different amount of monomer in polymer (1))
3. Polymer (3): (three modified groups; different amount of monomer in polymer (1))
4. SBR: SPRINTAN SLR6430 made by STYRON
5. BR: BR150B manufactured by Ube Industries, Ltd.
6. Denaturant: 3-(N, N-dimethylaminopropyl) trimethoxysilane manufactured by Azumax Co., Ltd.
7. Anti-aging agent: Nocrack 6C (N-1,3-dimethylbutyl-N'-phenyl-p-phenylenediamine) manufactured by Ouchi Shinko Kagaku Kogyo Co., Ltd.
8. Stearic acid: Stearin manufactured by NOF CORPORATION
9. Zinc oxide: Ginrei R manufactured by Toho Zinc Co., Ltd.
10. Aromatic oil: Diana Process AH-24 manufactured by Idemitsu Kosan Co., Ltd.
11. Wax: Sunknock wax manufactured by Ouchi Shinko Kagaku Kogyo Co., Ltd.
12. Sulfur: Powdered sulfur manufactured by Tsurumi Chemical Co., Ltd.
13. Vulcanization accelerator (1): Noxeller CZ manufactured by Ouchi Shinko Kagaku Kogyo Co., Ltd.
14. Vulcanization accelerator (2): Noxeller D manufactured by Ouchi Shinko Kagaku Kogyo Co., Ltd.
15. Silica: Ultra Jill VN3 made by Degussa
16. Silane Coupling Agent: Si69 from Degussa
17. Carbon Black: Dia Black LH (N326, N2SA: 84 $m^2/g$) manufactured by Mitsubishi Chemical Corporation The monomers and polymers (1) to (3) were synthesized by the same procedures as that described in "Examples" of Patent Document, Japanese Unexamined Patent Application Publication 2017-83182. The test methods are as follows.

Measurement of Volume Change of Low-Density Portions:

Three columnar test pieces made of the elastic materials A to C with a diameter of 20 mm and an axial length of 1 mm were prepared. Then, strain (tensile strain) was applied to each test piece according to the procedure shown in FIG. 3. Then, the projected images of each test piece were obtained at the first time when the strain reaches the first threshold value (0.6) and at the second time after a predetermined time (0.2 seconds) has elapsed from the first time. Then, the ratio Vt/V0 of the volume Vt of the low-density portions at the second time to the volume V0 of the low-density portions at the first time was obtained as the volume change of the low-density portions. The smaller the volume change of the low-density portions (value of the ratio Vt/V0), the better the wear resistance.

Ramborn Test:

The amount of wear of the elastic materials A to C was measured using a Ramborn type wear tester under the conditions of room temperature, load 1.0 kgf, and slip ratio 30%, and the reciprocal of the amounts were calculated. The results are shown in Table 1 using an index with the value of the elastic material A as 100, and the larger the value, the better the wear resistance performance.

Actual Vehicle Running Test:

Three kinds of pneumatic tires of size 195/65R15 with tread portions made of the elastic materials A to C were prepared, respectively. Each tire was mounted on a Japanese FF vehicle, and a groove depth of the tread portion at a mileage of 8000 km was measured. Then, the mileage per 1 mm of wear on the tread portion was calculated. The test results are shown in Table 1 using an index with the value of the elastic material A as 100, and the larger the value, the better the wear resistance.

Table 1 shows the test results.

TABLE 1

| | Elastic material | A | B | C |
|---|---|---|---|---|
| Formulation (Parts by mass) | BR | 20 | 20 | 20 |
| | Polymer (1) | 53 | — | — |
| | Polymer (2) | — | 53 | — |
| | Polymer (3) | — | — | 53 |
| | SBR | 27 | 27 | 27 |
| | Silica | 69 | 69 | 69 |
| | Silane coupling agent | 6 | 6 | 6 |
| | carbon black | 5 | 5 | 5 |
| | Aroma oil | 21 | 19 | 19 |
| | Stearic acid | 2 | 2 | 2 |
| | Zinc oxide | 3 | 3 | 3 |
| | Antiaging agent | 1 | 1 | 1 |
| | Wax | 1 | 1 | 1 |
| | Sulfur | 1.5 | 1.5 | 1.5 |
| | Vulcanization accelerator (1) | 1 | 1 | 1 |
| | Vulcanization accelerator (2) | 1 | 1 | 1 |
| Example | Volume change of low-density portions (Vt/V0) | 1.32 | 1.19 | 1.08 |
| Reference | Lambourn abrasion test (index) | 100 | 101 | 101 |
| | Actual vehicle running test (index) | 100 | 110 | 118 |

As a result of the test, as is clear from Table 1, the method of the example had a better correlation with the actual vehicle running test than the comparative example, and the performance of the elastic materials could be predicted (evaluated). Further, in the example, the elastic materials B and C which have the volume changes of the low-density portions being equal to or less than the second threshold value showed significantly excellent in the actual vehicle running test as compared with the elastic material A which have the volume change of low-density portions being larger than the second threshold value. As described above, the present disclosure was able to predict various performances of elastic materials with high accuracy.

[Additional Note]

The present disclosure includes the following aspects.

[Note 1]

A performance evaluation method for elastic material including rubber or elastomer, the method comprising:
- a step of applying a strain to a test piece made of an elastic material to form at least one low-density portion inside the test piece;
- after forming the at least one low-density portion, a step of obtaining projected images of the test piece by irradiating the test piece with X-rays at a predetermined first time and at a second time after the first time;
- a step of identifying the at least one low-density portion based on the projected images at the first time;
- a step of identifying the at least one low-density portion based on the projected images at the second time;
- a step of identifying a volume change of the at least one low-density portion between the first time and the second time; and
- a step of outputting the volume change as one of indicators of performance of the elastic material.

[Note 2]

The performance evaluation method according to note 1, wherein
the first time is time when a strain given to the test piece reaches a predetermined first threshold value.

[Note 3]

The performance evaluation method according to note 2, wherein
the first threshold value is equal to or more than 0.2.

[Note 4]

The performance evaluation method according to note 1 or 2, wherein
the second time is time after 0.1 to 1200 seconds elapsed from the first time.

[Note 5]

The performance evaluation method according to any one of notes 1 to 4, wherein
the step of identifying the volume change identifies a ratio Vt/V0 between a volume V0 of the at least one low-density portion at the first time and a volume Vt of the at least one low-density portion at the second time, as the volume change.

[Note 6]

The performance evaluation method according to note 5 further comprising
a step of comparing the ratio Vt/V0 with a predetermined second threshold value, and
a step of determining that the performance of the elastic material is good when the ratio Vt/V0 is equal to or less than the second threshold value.

[Note 7]

The performance evaluation method according to note 6, wherein
the second threshold value is in a range from 1.0 to 3.0.

[Note 8]

The performance evaluation method according to any one of notes 1 to 7, wherein
the strain is a tensile strain.

[Note 9]

The performance evaluation method according to any one of notes 1 to 8, wherein
the elastic material is rubber obtained using one or more kinds of conjugated diene compounds.

[Note 10]

The performance evaluation method according to any one of notes 1 to 9, wherein
the rubber is rubber for tires.

[Note 11]

The performance evaluation method according to any one of notes 1 to 10, wherein
the X-rays have brightness equal to or more than $10^{10}$ (photons/s/mrad$^2$/mm$^2$/0.1% bw).

The invention claimed is:

1. A method for producing or designing a tire, the method comprising:
a step of applying a strain to a test piece made of an elastic material to form at least one low-density portion inside the test piece;
after forming the at least one low-density portion, a step of obtaining projected images of the test piece by irradiating the test piece with X-rays at a predetermined first time and at a second time after the first time;
a step of inputting the projected images of the test piece into a storage unit of a computer having a central processing unit;

a step of identifying the at least one low-density portion based on the projected images, wherein
the central processing unit executes:
   a step of identifying the at least one low-density portion based on the projected images at the first time;
   a step of identifying the at least one low-density portion based on the projected images at the second time; and
   a step of identifying a volume change as a ratio Vt/V0 between a volume V0 of the at least one low-density portion at the first time and a volume Vt of the at least one low-density portion at the second time, as the volume change;
a step of obtaining the elastic material which satisfies that the ratio Vt/V0 is equal to or less than a second threshold value; and
a step of producing or designing a tire by using the elastic material.

2. The method according to claim 1, wherein
the first time is time when a strain given to the test piece reaches a predetermined first threshold value.

3. The method according to claim 2, wherein
the predetermined first threshold value is equal to or more than 0.2.

4. The method according to claim 2, wherein
after the strain reaches the first threshold, the strain to the test piece is maintained.

5. The method according to claim 2, wherein
the second time is time after 0.1 to 1200 seconds elapsed from the first time.

6. The method according to claim 2, wherein
the strain is a tensile strain.

7. The method according to claim 2, wherein
the elastic material is rubber obtained using one or more kinds of conjugated diene compounds.

8. The method according to claim 2, wherein
the X-rays have brightness equal to or more than $10^{10}$ (photons/s/mrad$^2$/mm$^2$/0.1% bw).

9. The method according to claim 1, wherein
the second time is time after 0.1 to 1200 seconds elapsed from the first time.

10. The method according to claim 1, wherein
the second threshold value is in a range from 1.0 to 3.0.

11. The method according to claim 1, wherein
the strain is a tensile strain.

12. The method according to claim 1, wherein
the elastic material is rubber obtained using one or more kinds of conjugated diene compounds.

13. The method according to claim 12, wherein
the rubber is rubber for tires.

14. The method according to claim 1, wherein
the X-rays have brightness equal to or more than $10^{10}$ (photons/s/mrad$^2$/mm$^2$/0.1% bw).

* * * * *